Feb. 26, 1924.
A. E. AUGUSTINE
1,484,753
GUM BOX DRIVE MECHANISM FOR ENVELOPE MAKING MACHINES
Filed Aug. 5, 1919    2 Sheets-Sheet 2
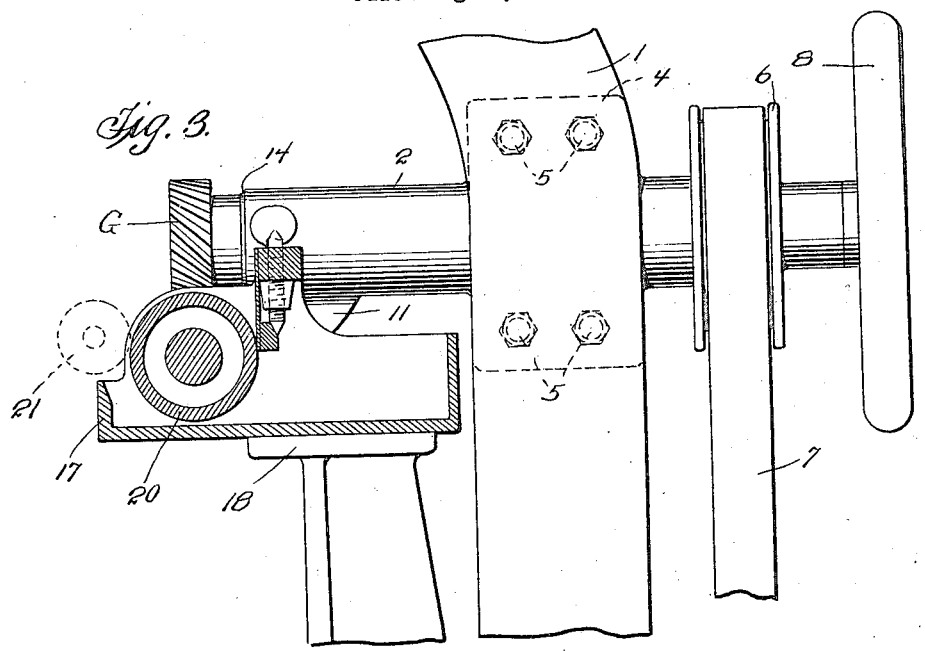
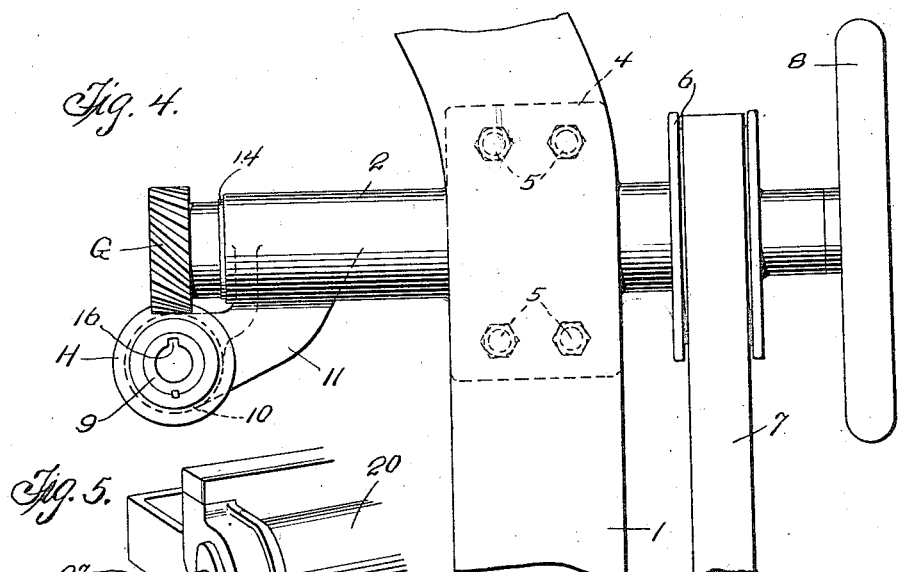
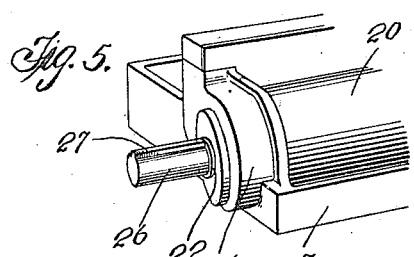

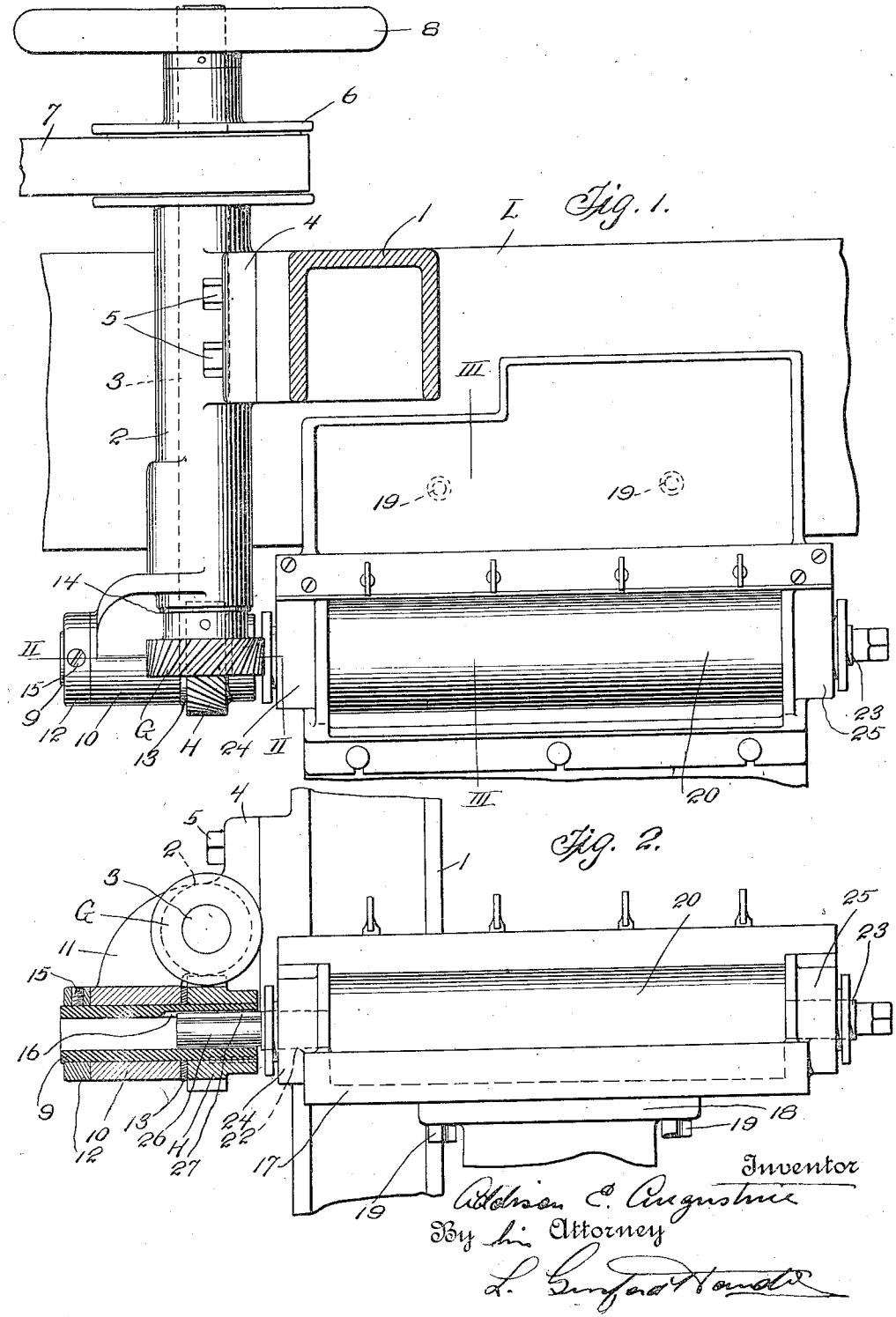

Patented Feb. 26, 1924.

1,484,753

UNITED STATES PATENT OFFICE.

ADDISON E. AUGUSTINE, OF HACKENSACK, NEW JERSEY, ASSIGNOR TO CHESTER MACHINE CO., INC., OF NEW YORK, N. Y., A CORPORATION OF NEW YORK.

GUM-BOX DRIVE MECHANISM FOR ENVELOPE-MAKING MACHINES.

Application filed August 5, 1919. Serial No. 315,396.

*To all whom it may concern:*

Be it known that I, ADDISON E. AUGUSTINE, residing at Hackensack, in the county of Bergen and State of New Jersey, have invented certain new and useful Improvements in Gum-Box Drive Mechanism for Envelope-Making Machines, of which the following is a specification.

This invention relates to gum box drive mechanism for envelope-making machines and the like, and the object of the invention is to provide a drive mechanism which is more simple, more quiet in its operation, and at the same time more practical and efficient than heretofore.

A further object is to provide drive mechanism of such character that the gum box may be readily placed into or lifted out of driving connection therewith without necessity for disturbing any part of the drive mechanism.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claim.

In the accompanying drawings which are to be taken as a part of this specification, and in which I have shown merely a preferred form of embodiment of the invention:—

Figure 1 is a top plan view of a gum box device illustrating the drive mechanism of this invention connected in operative association therewith.

Figure 2 is a front elevational view of the structure shown in Fig. 1, the drive mechanism being illustrated in vertical section substantially upon the plane of line II of Fig. 1.

Figure 3 is a vertical sectional view taken substantially upon the plane of line III of Fig. 1.

Figure 4 is a view similar to that shown in Fig. 3 but the gum box being removed, and Figure 5 is a fragmentary perspective view of a portion of the gum box illustrating a projecting portion of the gum roller as it appears preparatory to being inserted in operative connection with the drive mechanism.

Referring to the drawings for describing in detail the structural features which are illustrated therein, the reference character L indicates a portion of the main frame work of the envelope-making machine. Rising from the frame portion L is a standard 1 which serves as a support for the bearing sleeve 2 of a drive shaft 3. The bearing member 2 is provided with a suitable flange portion 4 cast integral therewith and serving as a means by which the bearing member is rigidly attached to the standard 1 thru the medium of attaching bolts or the like, as 5.

At the outer end of the bearing member the drive shaft 3 is fitted with a drive pulley 6 over which plays a belt 7 extending to a suitable source of power and serving to drive the shaft 3 continuously during the operation of the machine. A hand wheel or the like, as 8, may also be fixed to the shaft 3 if desired.

At the inner end of the bearing member the shaft has fixed rigidly thereto a gear G. The gear G is of the spiral type and its teeth stand in continuous engagement with the teeth of a similar spiral gear H mounted to rotate at right angles to the shaft 3 and positioned directly below the gear G.

The gear H is carried upon a shaft 9 which is rotatably mounted within a bearing sleeve 10 carried by, or formed integral with the bearing member 2, there being an appropriate extension arm 11 connecting between the sleeve 10 and the main bearing member 2.

The gear H is fixed rigidly upon the shaft 9 at one end of the shaft where said shaft projects beyond the adjacent end of the bearing sleeve 10. A collar 12 is fixed to the shaft 9 where said shaft projects beyond the opposite end of the bearing sleeve, and the collar and the gear H engage the opposite end surfaces of the bearing sleeve in such wise as to prevent longitudinal movement of the shaft within the bearing sleeve.

If desired a thrust collar, or similar device, as 13, may be positioned between the abutting surfaces of the gear H and the adjacent surface of the bearing sleeve adapted to receive the thrust of the gear and being replaceable when worn. In this way the gear H may be maintained always in proper cooperative relation with the gear G.

Likewise a thrust collar 14 may be provided between the gear G and the adjacent end surface of the bearing member 2 if desired.

The collar 12 may be held in position by any suitable means but preferably carries a set screw or the like, as 15, by which it may be connected with the shaft 9 in any position of adjustment.

The shaft 9 is formed hollow and is provided with a longitudinally extending key seat interiorly thereof, as at 16.

The gum box, as 17, is mounted upon a suitable support, as 18. Screws or other appropriate means, as 19, are provided by which the gum box may be attached to or removed from the support 18 at will.

Within the gum box is mounted a gum roller 20 such as is customary in devices of this character, said roller being adapted to revolve within the gum which is placed within the box, and to carry a portion of the gum upwardly for transferring it to a roller or other appropriate device, as 21, which is adapted in turn to apply the gum for use in the operation of the machine.

The roller 20, as illustrated, is formed with pivot parts 22 and 23 at its opposite ends which are rotatably mounted within bearings 24 and 25 respectively formed upon the box so that the roller is at all times carried with the box whenever the box is attached to or removed from the support 18.

The pivot part 22 at one end of the roller is formed with an extension 26 which, when the box is attached to the support 18, will project into the adjacent open end of the shaft 9. The extension 26 is formed with a longitudinally extending key 27 arranged for engaging within the key slot 16.

When the gum box is thus assembled with the drive mechanism then the roller 20 is connected to be positively driven from the shaft 9. The extension 26, however, preferably fits only loosely within the shaft 9. Thus, whenever it becomes necessary or desirable to dismount the gum box from its support the operator has simply to remove the holding means 19 and lift the gum box, with its extension 26, away from connection with the shaft 9. The shaft 9 may be in continuous rotation at this time, if desired. The removal of the gum box does not even necessitate stoppage of the machine.

In replacing the gum box it is also unnecessary to stop the rotation of the shaft 9 since the operator has merely to insert the extension 26 and then apply the holding means 19.

The drive mechanism, as thus described, is very direct and the type of gears employed makes the whole device practically noiseless. The absence of noise is due to the fact particularly that the teeth of gears of this type rub together rather than strike together as is the case in ordinary spur or bevel gears. Also, employment of this type of gears applies a continuous tendency for the shafts carrying the gears to be thrust in a direction against their respective thrust collars during the whole period of their operation so that rattling of the parts is effectively prevented.

As many changes could be made in this construction without departing from the scope of the invention as defined in the following claim, it is intended that all matter contained in the above description, or shown in the accompanying drawings, shall be interpreted as illustrative only and not in a limiting sense.

Having thus described my invention, what I claim as new and desire to secure by Letters Patent is:—

In a machine requiring gumming mechanism, the combination with a gum box having a roller therein, said roller having its bearing shaft projecting exteriorly of the box, of a drive mechanism for said roller, said drive mechanism comprising a bearing, a shaft rotatably mounted in said bearing, a gear carried by said shaft beyond said bearing, an extension part formed upon said bearing, a second shaft rotatably mounted in said extension upon an axis at an angle to said first shaft, a gear carried by the second shaft constantly meshing with the gear of the first shaft, said second shaft having a socket therein adapted to removably receive the projecting portion of said roller shaft in a manner to drive said roller, a support, and means whereby said bearing member and said mentioned shafts and gears are supported as an entity upon said support, a second support, and means whereby said gum box and said roller are supported as a separate entity upon said second support.

In testimony whereof I affix my signature in the presence of two witnesses.

ADDISON E. AUGUSTINE.

Witnesses:
L. GESSFORD HANDY,
MAY SCHULZ.